United States Patent [19]

Iwata et al.

[11] 4,181,581

[45] Jan. 1, 1980

[54] ACRYLONITRILE BLOCK-COPOLYMER COMPOSITION

[75] Inventors: Hiroshi Iwata; Takeiji Ohtani; Seiichi Arakawa; Seiji Deguchi, all of Otake, Japan

[73] Assignee: Mitsubishi Rayon Co., Ltd., Tokyo, Japan

[21] Appl. No.: 964,651

[22] Filed: Nov. 29, 1978

[30] Foreign Application Priority Data

Nov. 29, 1977 [JP] Japan .................. 52-143013

[51] Int. Cl.$^2$ .................. C08L 51/00; C08L 53/00
[52] U.S. Cl. .................. 260/42.48; 260/42.49; 260/65.75 B; 525/92; 525/94
[58] Field of Search .............. 260/876 B, 42.48, 42.49, 260/45.75 B, 881, 884, 885

[56] References Cited

U.S. PATENT DOCUMENTS

| | | | |
|---|---|---|---|
| 3,497,572 | 2/1970 | Childers et al. | 260/876 B |
| 3,801,529 | 4/1974 | Potter | 260/30.6 R |
| 3,975,460 | 8/1976 | Davison et al. | 260/876 B |
| 4,096,204 | 6/1978 | Gergen et al. | 260/876 B |
| 4,111,894 | 9/1978 | Gergen et al. | 260/40 R |
| 4,111,896 | 9/1978 | Gergen et al. | 260/42.18 |
| 4,126,600 | 11/1978 | Gergen et al. | 260/42.18 X |

*Primary Examiner*—Richard B. Turer
*Attorney, Agent, or Firm*—Oblon, Fisher, Spivak, McClelland & Maier

[57] ABSTRACT

An acrylonitrile polymer composition comprising an admixture of (I) 30 to 80 weight % of an acrylonitrile polymer containing at least 40 weight % acrylonitrile;

(II) 10 to 80 weight % of a chlorine containing polymer having a chlorine content of at least 20 weight %; and (III) 0.5 to 10 weight % of an A-B block copolymer in which B is acrylonitrile and A is a monomer copolymerizable with monomer B.

6 Claims, 19 Drawing Figures

ACRYLONITRILE BLOCK-COPOLYMER COMPOSITION

BACKGROUND OF THE INVENTION

1. Field of the Invention

This invention relates to new acrylonitrile polymer compositions and in particular to an acrylonitrile polymer composition from which flame-retardant fibers or films may be prepared.

2. Description of the Prior Art

Various method of producing flame-retarding acrylic fibers have been suggested. One method of producing flame-retarding fibers is by shaping a copolymer of acrylonitrile and a flame-retarding monomer, for example, such halogen-containing monomer as vinyl chloride, vinylidene chloride or vinyl bromide. A second method to produce a flame retarding fiber or film is by shaping a copolymer of acrylonitrile, vinyl halide and phosphate containing vinyl monomer. The fibers produced by said methods have high flame-retardance but also have many defects including poor heat stability, low dimensional stability, low fibrillating stability and poor light stability.

Another method of producing flame-retarding fibers is made by spinning a polymer mixture of chlorine containing polymer and acrytonilile polymer. The fibers obtained by said methods have poor mechanical properties. Said polymer mixture has a low compatibility. The spinning solution containing said polymer mixture does not have a high uniform phase and contains large particles of about 10 to about 1000 micron sizes as shown in FIG. 1.

In these spinning solutions the coarse particles coagulate with the lapse of time and thus the spinning ability deteriorates. The fibers produced by spinning this solution lack good bonding between the boundary surface of the chloride containing polymer and acrylonitrile polymer. The fibers tend to fibrilate and have a low wear-resistance.

SUMMARY OF THE INVENTION

This invention relates to the acrylonitrile polymer composition. Furthermore this invention relates to an acrylonitrile polymer composition which is able to produce a flame-retarding acrylonitrile fibers or films. The spinning solution produced by acrylonitrile polymer composition of this invention has good compatibility of the acrylonitrile polymer with a chlorine containing polymer and good spinning ability. Thus, the fibers made by spinning the polymer composition of this invention has good fluffing resistance and good wear resistance.

DESCRIPTION OF THE PREFERRED EMBODIMENTS

Figure 1:
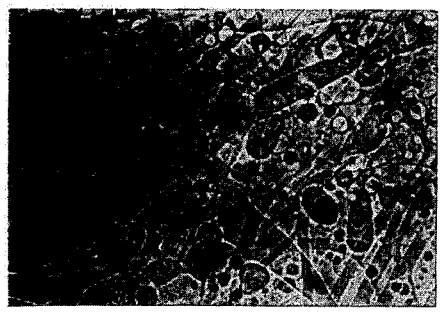
FIG. 1. is a photograph magnified 150 times of a spinning solution prepared by dissolving the mixture of an acrylonitril polymer (I) [acrylonitrile/acrylamide/vinyl bromide=82/10/8 (% by weight)], polyvinyl chloride (II) [number average molecular weight about 1450) 30 parts and dimethyl acetaminde (prior art)]. The solution contains polymer particles of about 10 to about 1000 micron sizes.

The acrylonitrile polymer compositions of this invention are prepared by mixing acrylonitrile polymer (I), chlorine containing polymer (II) of chlorine content 20% by weight or more and an A-B type block copolymer (III) obtained by block-copolymerizing monomers A and B. Monomer A is selected from among acrylic-esters, methacrylic esters, vinylidene chloride, vinyl ester and vinyl bromide. Monomer B is acrylonitrile.

Acrylonitrile polymers (I) used in the present invention contain 40% by weight or more of acrylonitrile polymer units in said polymer (I). Another vinyl monomer can be copolymerized up to 60% by weight in said acrylonitrile polymer (I). These other vinyl monomers may be selected from vinyl acetate, styrene, vinyl propionate, acrylate esters such as methyl acrylate and ethyl acrylate, methacrylate esters such as methyl methacrylate and buthyl methacrylate, vinyl chloride, vinylidene chloride, vinyl bromide, acrylamide, methacrylamide, N-methylol acrylamide or methacrylamide. N-alkyl acrylamide or methacrylamide, allylsulfarnic acid and the salts, methallyl sulfonic acid and the salts, vinyl benzene sulfanic acid and the salts. The amount of said other vinyl monomer unit in said acrylonitrile polymer (I) is less than about 60% by weight. An acrylonitrile polymer containing more than 60% by weight of said other monomer unit has poor spinning ability, the fibers have poor mechanical properties and poor chemical properties.

A preferred acrylonitrile polymer (I) is a copolymer which is obtained by polymerizing more than 60% by weight of acrylonitrile, 3 to 20% by weight of monomer selected from vinyl chloride, vinyl bromide or vinylidene chloride and up to 57% by weight of another copolymerizable vinyl monomer.

The chlorine content of chlorine containing polymer (II) is more than 20% weight. Chlorine containing polymer with less than 20% by weight of chlorine have poor flame-retardance, so, said chlorine containing polymer should not be used in the present invention. Examples of said chlorine containing polymer (II) are polyvinyl chloride, polyvinylidene chloride, chlorinated polyethylene, chlorinated polypropylene, and a copolymer of vinyl chloride or vinylidene chloride and another comonomer such as vinyl acetate, acrylonitrile or stylene.

The A-B type block copolymer (III) used in this invention is obtained by block polymerizing A and B. Monomer A is a methyl methacrylate or acrylate, ethylmethacrylate or acrylate, bytyl acrylate or methacrylate, propyl acrylate or methacrylate, hexyl acrylate or methacrylate, 2-ethylhexyl acrylate or methacrylate, cyclohexyl acrylate or methacrylate, laulyl acrylate or methacrylate, stearyl acrylate or methacrylate, benzyl acrylate or methacrylate vinyl chloride, vinylidene chloride, vinyl bromide, vinyl acetate and the like. Monomer B is acrylonitrile. The copolymerizing ratio of the component monomer A and component monomer B of said A-B type block copolymer is not particularly limited. However, a ratio of component monomer A/component monomer B of 2/8 - 7/3 is desirable.

The A-B type block copolymer (III) can be produced by various polymerizing methods as, for example, inonic polymerization or radical polymerization. The preferred block co-polymerizing method for preparing the A-B block copolymer (III) is a two-step polymerizing method by using a polymerizing catalyst system which is combined a peroxide with the following formula and a reducing agent.

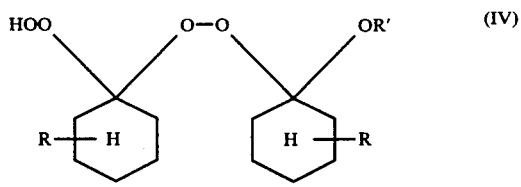

(IV)

(Wherein R is hydrogen atom or an alkyl radical, up to three alkyl radicals can be substituted for one cyclohexyl ring and R' is hydrogen or a hydroxyradical).

The reducing agent accelerates the decomposition of the hydroperoxy radical of said peroxide (IV), but does not accelerate the decomposition of the ketone peroxy radical of the above said peroxide (IV). Examples of said reducing agent are sodium sulfoxylate folmaldehyde, sodium sulfite, sodium hydrosulfite, sodium thiosulfate, sodium dithionite and dextrose. A-B type block copolymer (III) is produced according to the following reaction formulas:

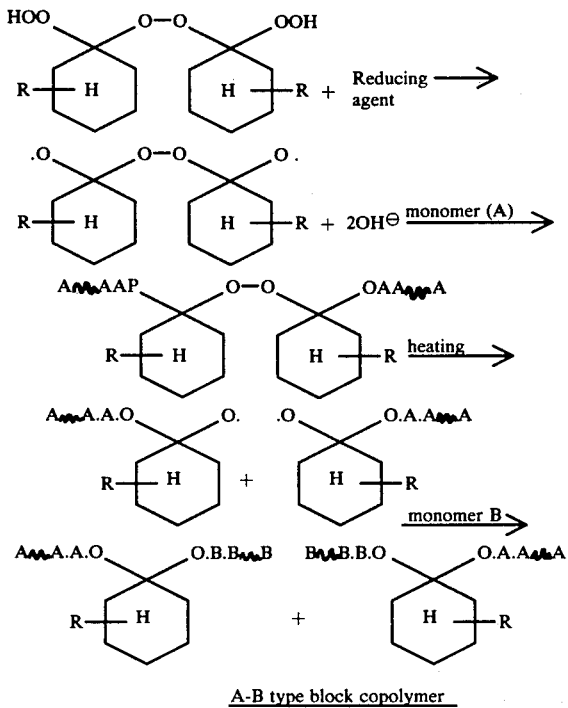

A-B type block copolymer

In producing said A-B type block copolymer by this method, another monomer C may be used together with the monomer A or monomer B, and an A-(B+C) or (A+C)-B type block copolymer with the made. The monomer C may comprise less than 50% by weight or preferably less than 25% by weight on the monomer A or B. If the average chain length of each segment in said A-B type block copolymer is too small, the compatibility an acrylonitrile polymer (I) and a chlorine containing polymer (II) of the present polymer composition is poor, so the polymer composition has poor molding properties. The polymer obtained by said A-B type block copolymerization contains three types polymer of A-B type block copolymer (III), homopolymer of monomer A and homopolymer of monomer B. The said obtained polymer composition containing A-B type block copolymer used in the present invention.

The new acrylonitrile polymer composition of the present invention consists of 30 to 80% by weight of said acrylonitrile polymer (I), 10 to 80% by weight of said chlorine containing polymer (II) of chlorine content 20% by weight or more, and 0.5 to 10% by weight of said A-B type block copolymer (III).

Figure 2:
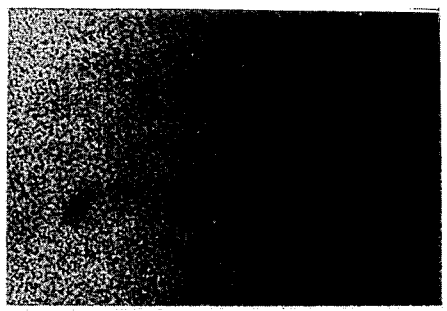
FIG. 2. is a photograph magnified 150 times of a spinning solution prepared by dissolving the mixture 70 parts of an acrylonitrile polymer [acrylonitrile/vinyl acetate/sodium metharyl sulphonate=92.5/7/0.05 (% by weight)], 30 parts of poly-vinylchloride (number average molecular weight about 1450), 2 parts of A-B type block copolymer (acrylonitrile/methyl methacrylate=50/50 by weight) and 500 parts of dimethylacetamide (this invention).

The content of said acrylonitrile polymer (I) in the acrylonitrile polymer composition must be 30 to 80% by weight. An acrylonitrile polymer composition containing less than 30% by weight of said acrylonitrile polymer (I) has poor molding properties. Such a polymer composition cannot be used to make a fiber with good mechanical and chemical properties. On the other hand, the acrylonitrile polymer composition containing 80% by weight or more of acrylonitrile polymer (I) has a poor flame-retardance. Such acrylonitriles polymer composition cannot be used to make flame-retarding fibers. The content of chlorine containing polymer (II) in the composition of this invention must be 10 to 80% by weight. A polymer composition containing less than 10% by weight of chlorine containing polymer (II) has a poor flame-retardance, and can not to be used in this invention. On the other hand, a polymer composition containing 80% by weight or more of chlorine containing polymer (II) has a poor molding ability and a poor weather resistance, and cannot be used to make a fiber having a good mechanical and chemical properties. The improvement of this invention is to have 0.5 to 10% by weight of said A-B type block copolymer (III) in the acrylonitrile polymer composition in this invention. The A-B type block copolymer (III) increases the compatibility of said acrylonitrile polymer (I) and chlorine containing polymer (II) in the polymer mixture of this invention. As shown FIG. 1, the compatibility of said acrylonitrile polymer (I) and said chlorine containing polymer (II) in the polymer mixture in very poor. However, as the polymer composition of this invention contains 0.5 to 10% by weight of above said A-B type block copolymer (III), as shown in FIG. 2, the compatibility of the acrylonitrile polymer (I) and the chlorine containing polymer (II) is very good. The polymer composition containing less than 0.5% by weight of said A-B type block copolymer doesn't show a good compatibility of said acrylonitrile polymer (I) and said chlorine containing polymer (II). On the other hand, the polymer composition containing more than 10% by weight of A-B type block copolymer can not to make high flame retardance fibers or films. Preferably, the contents of said A-B type block copolymer (III) in the present polymer composition is 1 to 5% by weight.

In the present invention, the chlorine content in the entire polymer composition should be more than 5% by weight. The polymer composition containing more than 5% by weight of chlorine has a superior flame-retardance. The polymer composition of the present invention can be made by mixing an acrylonitrile polymer (I), chlorine-containing polymer (II) and an A-B type block copolymer (III) with ordinary mixing method in the presence or absence of a solvent.

In making such moldings such as fibers or films from the said polymer composition of this present invention, it is preferable that a solvent is present in the said polymer composition. The solvent to be used can be an organic or inorganic solvent as dimethyl formamide, dimethylacetamide, dimethyl sulfoxide, γ-butyrolacton-,ethylencarbonate, thiocyanate aqueous solution, zinc chloride, aqueous solution, nitric acid solution.

An object of the present invention is to obtain an acrylonitrile polymer composition from which one can make flame-retarding acrylonitrile fibers or films having a good mechanical and chemical properties. Further, such a flame-retarder as antimony trioxide, antimony pentaoxide and zinc borate, or such additive or stabilizer as tin compounds, copper oxide, almium hydroxide, titanium oxide or zinc oxide may be added at a rate of 0.01 to 20% by weight. For producing a excellent flame-retarding fibers or films, 0.5 to 3% by weight of antimony oxide might to be add to the present polymer composition.

Fibers can made from the present polymer composition by such various spinning methods as the wet spinning method, dry-wet spinning method, semi-melt spinning method, emulsion spinning method and dry-spinning method.

The fiber goods made from the present polymer composition have a bulky feeling, excellent colour fastness, high wear resistance and a good fluffing resistance and have an excellent high flame-retardance never inferior to that of so far developed modacrylic fibers. Said modacrylic fibers heretofore have a poor light fastness, a poor washing resistance and an easy fluffing property, but the fibers made from the polymer composition of the present invention have no such deffects.

The present invention shall be explained more in detail with embodiments in the following. By the way, the measurements of fiber properties were judged by the following conditions:

Strength and Elongation Characteristics

Measured according to the method shown in JIS L-1074.

Flame-Retardance 10 g of staple fibers were made a needle-punched carpet piece of width of 10 mm, length of 100 mm. And thickness of 5 mm, this carpet piece was settled so as to be perpendicular in an atmosphere of oxygen and nitrogen gas mixture and was ignited at the upper end and the LOI value was measured. The larger the LOI value, the higher the flame-resistance.

Dyeability

This was judged by measuring the dye exhausion rate of the fibers when the fibers were dyed at about 100° C. for 2 hours at a dye concentration of 5% o.w.f (on the weight of the fibers) and a bath ratio of 1:50 by using C.I. Basic Blue 3 as a dye.

Fibrillating Degree 0.4 g of the sample made by opening the fibers dyed by the above mentioned dyeing method was wrapped with a white nylon cloth and was rubbed 2000 times on the cloth while applying a load of 500 g, the amount of the dye adsorbed on the white nylon cloth was measured by the colorimetric analysis and F-value was calculated. The F-value was shown by such numerical value at intervals of 0.5 as 0, 0.5, 1 or 1.5 by ignoring fractions. The fact that this F-value is large shows that the dye falling from the said dyed fibers is large. Also, F-value shows a fibrilating degree. The fibers with high F-value have high fibrilating degree.

A-B TYPE BLOCK POLYMER POLYMERIZATION

Case 1

2.5 g of cyclohexanone peroxide as dissolved in 100 g of methyl methacrylate (monomer B) were mixed with 400 g of deionized water and 2 g of sodium diocthyl sulfosuccinate and the mixture was put into a polymerizing kettle. The above mentioned mixture was kept at 40° C. and the air in the polymerizing kettle was replaced with nitrogen gas. 20 g of rongalit and 0.0003 g of ferrous sulfate as dissolved in 100 g of water were added to the mixture. When the mixture was kept at 40° C. for 2 hours while beeing agitated, an emulsion containing polymethyl methacrylate was produced. When 100 g of acrylonitrile (monomer A) and 700 g of deionized water were added to this emulsion and the mixture was polymerized at 70° C. for 3 hours, the polymerization phase changed to a suspension phase. When the polymerized suspension solution was filtered, the obtained polymer was washed by deionized water and dried. An polymer mixture containing A-B type block copolymer (X) was obtained. When the obtained polymer was analized by a fractional precipitating analysis, it was found to be a mixture of three type polymers of 37% by weight of the above said A-B type block copolymer (X), 24% by weight of polyacrylonitrile and 39% by weight of polymethylmethacrylate.

Case 2

Vinylidene chloride as monomer B and a monomer mixture of acrylonitrile vinyl acetate (90/10:% by weight ratio) as a monomer A were polymerized by the same method as in Case 1 to obtain an polymer mixture containing A-B type block copolymer (Y). As the result of the said fractional precipitating analysis, the content of A-B type block copolymer (Y) was 32% by weight in the obtained polymer composition.

Case 3

100 g of methyl methacrylate as a monomer B and acrylonitrile/vinyl acetate of 90/10 (% by weight) as monomer A were copolymerized by the same method in Case 1 to obtain a polymer mixture containing an A-B type block copolymer (Z). The content of the A-B type block copolymer (Z) in the obtained polymer mixture is 31% by weight.

EXAMPLE 1

An acrylonitrilic polymer (I) of polymerized monomer ratio of acrylonitrile/acrylamide/vinyl bromide of 82/10/8 (% by weight) and a specific viscosity of 0.165 and three kind of a polyvinyl chloride of an number average molecular weight of 700, and a polyvinyl chloride of a number average molecular weight of 1450 and a chlorinated polyvinyl chloride (III) containing 64.6% by weight of chlorine were used. 5 parts of said polymer mixture containing A-B type block copolymer (X) oblained in Case 1, 30 parts of chlorine containing polymer (II) and 65 parts of said acrylonitrile polymer (I) were mixed. A-B type block copolymer (X) content in the said present polymer mixture was 1.91% by weight. 20 parts of the thus obtained polymer mixture were dissolved in 80 parts of dimethylfolnamide.

Figure 3A:
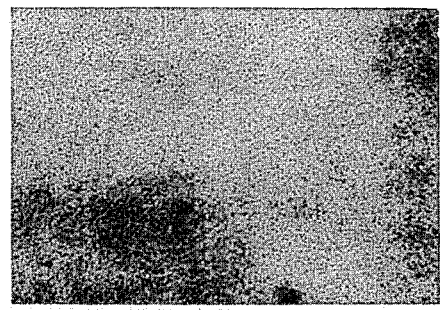
FIG. 3. is a photograph magnified 150 times of the spinning solution of Example 1.
Figure 3B:
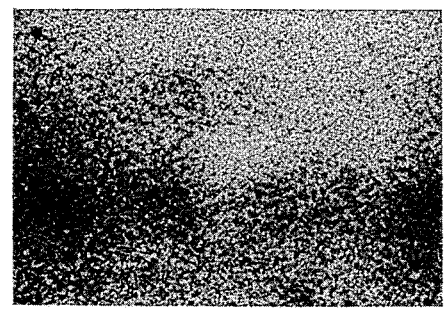
Figure 3C:
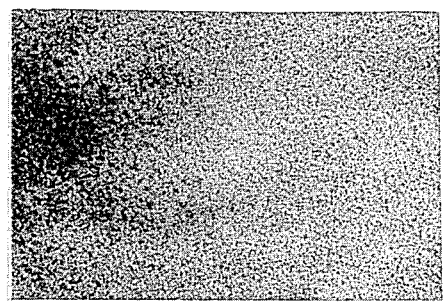
Figure 4A:
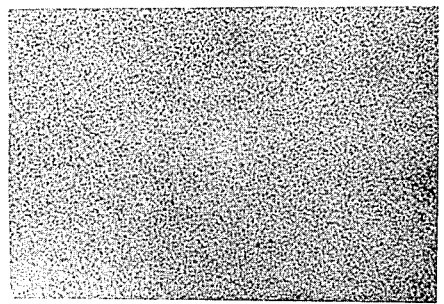
FIG. 4. is a photograph magnified 150 times of the spinning solution of example 4-$a$ to 4-$d$ in FIG. 4 are photograph of this invention polymer mixture. 4-$b'$ and 4-$c'$ in FIG. 4 are photograph of prior art polymer mixture.
Figure 4B:
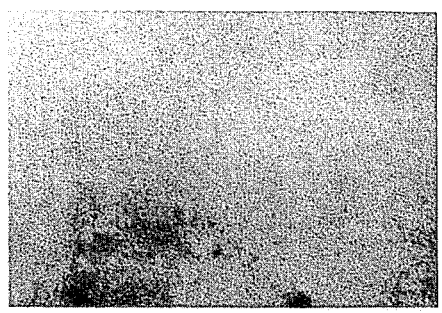
Figure 4B:
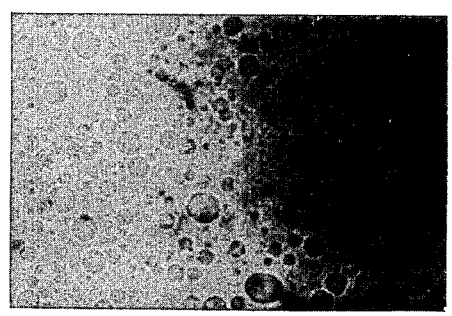
Figure 4C:
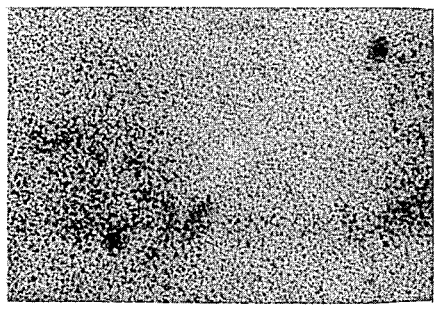
Figure 4C:
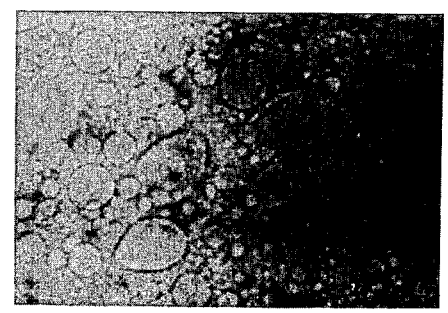
Figure 4D:
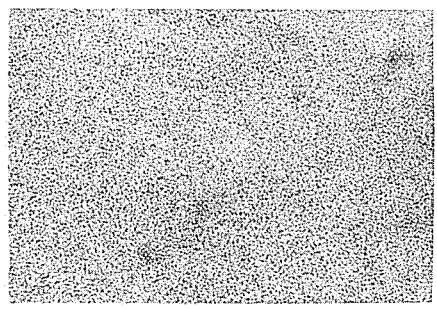
Figure 5A:
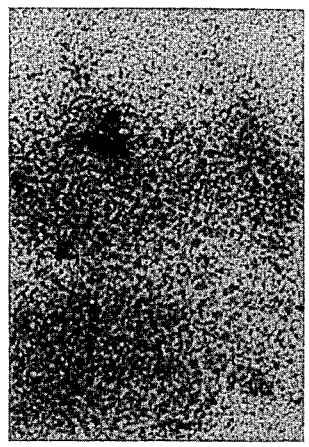
FIG. 5.
Figure 5D:
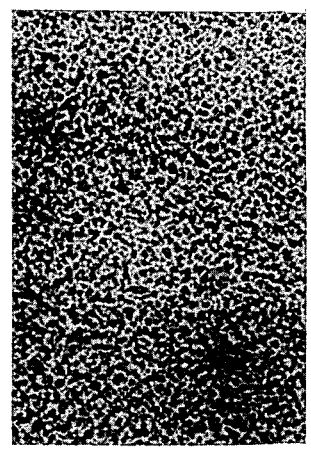
Figure 5B:
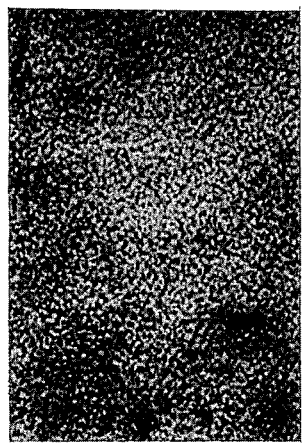
Figure 5E:
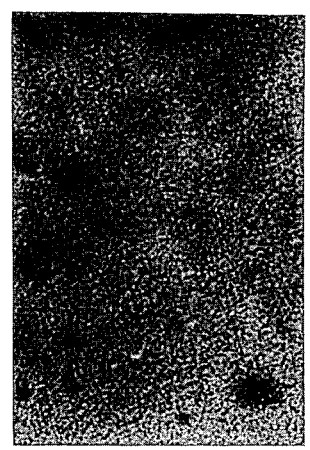
Figure 5C:
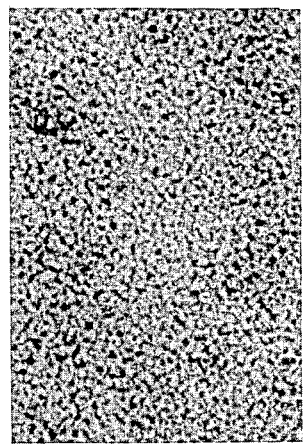

Electron microscopic photograph magnified to be 150 times as large of the said three kind of polymer mixture solution of the present invention are shown in FIG. 3., in which 3-a shows a polymer composition solution containing polyvinyl chloride of a number average molecular weight 700 as chlorine containing polymer (II), 3-b shows a polymer composition solution containing a polyvinyl chloride of a number average molecular weight 1450 as a chlorine containing polymer (II) and 3-c shows a polymer composition containing chlorinated polyvinyl chloride with 64.6% by weight of Electronmicroscopic photographs magnified to be 150 times as large of 6 kind of said polymer composition solutions are show as FIG. 4. Even when the solutions shown by experiment No. 1 to No. 4 (contents of A-B type block copolymer are 1.65% by weight) in Table 1 were left standing, no phase exchange was observed, but when those of experiment No. 5 and No. 6 (which doesn't contain A-B type block copolymer) were left standing, the coagulation of dissolved polymer particles were observed.

Six kind of fibers were mad by wet spinning the above six kinds of polymer solutions in Table 1. When their dyeability, flame-retardance and fibrillating degree were measured. The fibers made from the polymer composition solutions of experiment No. 1 to No. 4 in table 1 have a dyeability of about 74%, LOI value of about 27 to about 30 and F-value of 0.52, the fibers made from the polymer composition solutions of experiment No. 5 and No. 6 have LOI value of about 27 to about 30 and F-value of 3 to 4. But the polymer composition solutions of experiment No. 5 and No. 4 have a poor spinning ability.

Table 1

| Experiment No. | Composition (in % by weight) of acrylonitrile polymer (I) | Composition (in % by weight) of chlorine-containing polymer (II) | Acrylo-nitrile/ polymer (I)/ Chlorin containing poly-mer (II) Composition ratio (in % by weight) | Polymer composition obtained in Case 2 Chlorine content (in % by weight) in the composition | Photograph No. in FIG. 4 |
|---|---|---|---|---|---|
| 1 | AN/AAm/VBr = 82/10/8 | AN/VCl$_2$/VBSA = 50/49/1 | 65/30/5 | 13.1 | 4 - a |
| 2 | AN/AAm/VBr = 82/10/8 | Polyvinyl chloride (average number molecular weight 700) | 65/30/5 | 19.3 | 4 - b |
| 3 | AN/MA/VBr = 87/8/5 | Polyvinyl chloride (average number molecular weight 700) | 65/30/5 | 19.3 | 4 - c |
| 4 | AN/VAc/VBr/MSA = 88.5/7/3.5/1 | Polyvinyl chloride (average number molecular weight 700) | 65/30/5 | 19.3 | 4 - d |
| 5 | AN/AAm/VBr = 82/10/8 | Polyvinyl chloride (average number molecular weight 700) | Polymer (I)/Polymer (II) = 70/30 | 17.0 | 4 - b' |
| 6 | AN/MA/VBr = 87/8/5 | Polyvinyl chloride average number molecular weight 700 | Polymer (I)/Polymer (II) = 70/30 | 17.0 | 4 - c' |

The signes in Table 1 are as follows:
AN: Acrylonitrile
AAm: Acrylamide
VBr: Vinyl bromide
MA: Methyl acrylate
VAc: Vinyl acetate
MSA: Sodium metharyl sulfonate
VBSA: Sodium vinyl benzene sulfonate chlorine as chlorine containing polymer (II).

Even when the above said three kind of polymer composition solutions 3-a, 3-b and 3-c were left standing, the coagulation of polymer particles in the solution were not observed and were stable. Three kind of acrylonitrile fibers were made by wet spinning method from above said three kind of polymer composition solutions. When their flame retardance were measured, such excellent results as an LOI value of 27 to 30, a degree of dye exhaution about 73% and F-value of 0.5 were measured.

EXAMPLE 2

The acrylonitrile polymer (I) and chlorine containing polymer (II) shown in Table 1 and a polymer mixture containing A-B type block copolymer (II) obtained in Case 2 were mixed at the ratio shown in Table 1, 22.5% by weight of above said polymer mixture were dissolved in 77.5% by weight of dimethyl acetamide.

EXAMPLE 3

60 parts by weight of acrylonitrile polymer (I) (acrylonitrile/vinyl bromide/vinyl acetate/sodium metharyl sulfonate = 84.5/7/8/0.5: % by weight) 35 parts by weight of chlorine containing polymer (II) (polyvinyl chloride with an average number molecular weight 700) and the polymer mixture obtained by Case 3 were mixed. The above said polymer mixture contains 1.60% by weight of A-B type block copolymer (Z). 100 parts by weight of thus obtained polymer mixture were dissolved in 335 parts by weight of dimethyl acetamide. The thus obtained polymer mixture solution shown a high dispersed state as shown in FIG. 2. This polymer mixture solution extruded through a nozzle of 2000 orifices of an orifice diameter of 0.10 mm into a coagulating bath, which is an aqueous solution of 50 volume % of acetylacetamide kept at 40° C., so as to be fibers. The thus obtained fiber wound up at a velocity of 10 m/min., were washed by hot water, were drafted to be 5.5 times as long in boiling water, were dried and annealed and further were crimped mechanically. Then the fibers were relaxed for 10 minutes in a steam oven under pressure and were shrinked by 30%. The obtained fiber named fiber A. Fiber A is 5 deniers per filament.

23 parts by weight of an acrylonitrile polymer (I) were dissolved in 78 parts by weight of dimethylacetamide. This polymer solution was spun by the same method as above said spinning method. The thus obtained fiber named fiber B.

The fiber's properties of fiber A, fiber B and commercialized acrylonitrile fiber were measured and showed in Table 2. On the other hand, 60 parts by weight of above said acrylonitrile polymer (I) and 35 parts by weight of above chlorine containing polymer (II) were dissolved in 335 parts by weight of dimethylacetamide. The microscopic photograph magnified to be 150 times as large of the said polymer solution is similar to the photograph as shown in FIG. 1. When this polymer solution was spun by wet spinning method as above said, many end breakage of fibers were observed while drafting. The spinning ability of said polymer solution was inferier. The obtained fiber has properties such as 5.1 denier per fiber, strength of 1.75 g/d, elongation of 33.8%, knot tenacity of 1.44 g/d., LOI value of 28.7 and F-value of 3 to 4.

1 part by weight of antimony oxide with average particle diameter of 0.3 micron and 0.25 parts by weight of dibutyl tin maleate were added for 435 parts by weight of said polymer solution which was used in producing fiber A.

Acrylonitrile fibers were obtained by wet spinning the polymer solution with antimony oxide and dibutyl tin maleate. The obtained acrylonitrile fiber have the fiber properties such as 5.15 denier per filament, strength of 2.24 g/d., elongation of 52.1%, knot tenacity of 2.10 g/d, LOI value (flame-retardance) of 30, dyeability of 73.2% and F-value of 1.0.

EXAMPLE 4

Polymethyl methacrylate was produced by polymerizing methyl methacrylate at 60° C. by using triethylamine as solvent and azobisisobutylonitrile as a catalyst. A solution prepared by disolving the said polymethyl methacrylate in benzene was added acrylonitrile.

Table 2

| Fiber Kind | Denier per filament | Strength (g/d) | Elongation (%) | knot tenacity (g/d) | Flame-retardance LOI | Dyeability (%) | Fibrelating degree (F-value) |
|---|---|---|---|---|---|---|---|
| A | 5.1 | 2.20 | 49.4 | 2.15 | 28.5 | 73.8 | 0.5 |
| B | 5.0 | 2.35 | 46.6 | 2.20 | 25.5 | 86.5 | 0.5 |
| Commercial acrylonitrile fiber | 5.1 | 2.48 | 43.2 | 2.28 | 18.5 | 75 | <0.5 |

Polymethyl methacrylate and acrylonitrile were polymerized by keeping the said solution at 60° C. to obtain an A-B type block copolymer (N) which the ratio of acrylonitrile/methylmethacrylate was 1/1 (by weight).

68 parts by weight of acrylonitrile polymer (I) (acrylonitrile/vinyl acetate/sodium metharyl sulfonate=92.5/7/0.5: % by weight), 30 parts by weight of chlorin-containing polymer (II) as shown in Table 3 and 2 parts by weight of said A-B type block copolymer (N) were dissolved in 500 parts by weight of dimethylacetamide. Electron microscopic photograph (150 times as large) of said polymer solution are shown in FIG. 5.

Table 3

| Experimental No. | Chlorine containing polymer (II) | Chlorine content of the polymer mixture (% by weight) | Photograph in FIG. 4 |
|---|---|---|---|
| 7 | Polyvinyl chloride of average number molecular weight 700 | 17.0 | 5 - a |
| 8 | Polyvinyl chloride of average number molecular weight 1450 | 17.0 | 5 - b |
| 9 | VCl/VAe (= 75/25) copolymer | 12.7 | 5 - c |
| 10 | Chlorinated polyvinyl chloride of 64.6% by weight of chlorine content | 19.4 | 5 - d |
|  | AN/VdCl$_2$/BVSA (= 50/49/1) copolymer | 10.8 | 5 - e |

The signs in Table 3 are as follows:
AN: Acrylonitrile
VAc: Vinyl acetate
VdCl$_2$: Vinylidene chloride
BVSA: Sodium vinyl benzene sulfonate When these polymer solutions of experiment No. 7 to No. 11 in Table 3 were wet-spun by the same method as in Example 3. Their spinning ability is good. The LOI values of the thus obtained fibers shown about 27 to about 30.

EXAMPLE 5

Figure 6A:
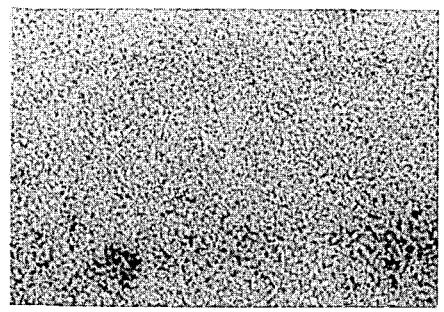
FIG. 6. are photographs magnified 150 times the spinning solution of Example 4 and Example 5 respectively.
Figure 6B:
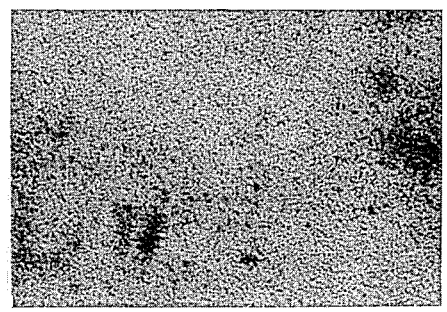
Figure 6C:
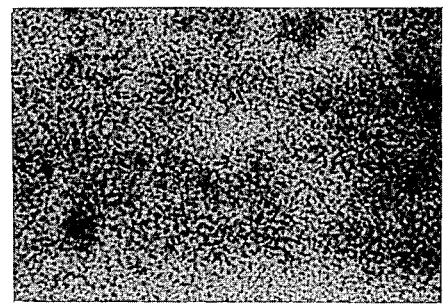

An acrylonitrile polymer (I) (acrylonitrile/methylmethacrylate/sodium metharylsulfonate=92.0/7.0/1.0: % by weight), a chlorine containing polymer (II) (polyvinyl chloride of an average number molecular weight 700) and the said polymer composition obtained in Case 1 were mixed at the ratio shown in Table 4 and these polymer compositions were dissolved in dimethyl formamide so that the solid concentration might to 24% by weight. Electron microscopic photographs to be 150 times as large of the above said polymer composition solutions are shown in FIG. 6.

Table 4

| Experiment No. | Acrylonitrile polymer (I) (parts) | Chlorin containing polymer (II) (parts) | Polymer composition in Case 1 | | Chlorin content (%) | Photograph in FIG. 5 |
|---|---|---|---|---|---|---|
|  |  |  | Parts | A-B type block copolymer (Parts) |  |  |
| 12 | 65 | 30 | 5 | 1.91 | 17.0 | 6 - a |
| 13 | 50 | 45 | 5 | 1.91 | 25.5 | 6 - b |
| 14 | 30 | 60 | 10 | 3.95 | 34.0 | 6 - c |

The stability of the solutions of Experiments No. 12 to No. 14 in Table 4 were very good. The coagulation of the polymer particles in these polymer solutions are not observed. The fibers produced by ordinary spinning method these polymer solutions have an LOI of 23.5 to 8 and F-value so high as to be 0.5 to 1.

EXAMPLE 6

55 parts of an acrylonitrile polymer (I) (acrylonitrile/vinyl acetate/sodium methallylsulfonate=92.5/7.0/0.5: % by weight) of a specific viscosity $[\eta]sp=0.170$, 40 parts of a chlorine containing polymer (II) (polyvinyl chloride of an average number molecular weight of 700) and 5 parts of a polymer mixture obtained in Case 3 as an A-B type block copolymer (III) were dissolved in dimethyl acetamide so that the solid concentration might be 22.7% by weight. The concentration of A-B type block copolymer (Z) in the above said polymer composition was 1.60% by weight and the chlorine content in the said polymer composition was 22.7% by weight.

A polymer mixture solution containing antimony trioxid was prepared by adding antimony trioxide so as to be 1.0% by weight on the polymer mixture for above said polymer mixture solution. When the above said 2 kinds of polymer mixture solutions were wet-spun in the same manner as in Example 3. The stability of the polymer mixture solutions were good that no spinning trouble observed in spinning process. The fiber's properties of said obtained fibers are shown in Table 5.

Table 5

| Experiment No. | Concentration of antimony trioxide (%) | Denier per filament | Strength (g/d) | Elongation (%) | Knot tenacity (g/d) | LOI value | Dyeability (%) |
|---|---|---|---|---|---|---|---|
| 15 | 0 | 15.2 | 2.45 | 48.7 | 2.26 | 24.5 | 72.6 |
| 16 | 1.0 | 15.3 | 2.34 | 46.6 | 2.29 | 26.5 | 74.4 |

What is claimed is:

1. An acrylonitrile polymer composition comprising an admixture of
   (I) 30 to 80 weight % of an acrylonitrile polymer containing at least 40 weight % acrylonitrile;
   (II) 10 to 80 weight % of a chlorine containing polymer derived from an ethylenically unsaturated monomer having a chlorine content of at least 20 weight %; and
   (III) 0.5 to 10 weight % of an A-B block copolymer in which B is acrylonitrile and A is a monomer copolymerizable with monomer B.

2. The acrylonitrile polymer composition of claim 1, wherein the chlorine containing polymer (II) is a polymer containing at least 75 weight % of the repeating units derived from vinyl chloride or vinylidene chloride.

3. The acrylonitrile polymer composition of claim 1, wherein the A-B type block copolymer (III) is obtained by block copolymerizing at least one monomer A selected from the group consisting of acrylic esters, methacrylic esters, vinyl chloride, vinylidene chloride and vinyl bromide and acrylonitrile as monomer B.

4. The acrylonitrile polymer composition of claim 1 or claim 3, wherein the A-B type block copolymer is obtained by copolymerizing monomer A and monomer B by using a block polymerizing catalyst having the following formula:

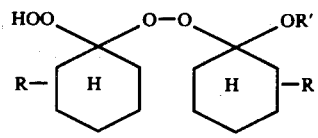

wherein R is hydrogen atoms or an alkyl group wherein each cyclohexyl ring can contain up to three alkyl groups, and R' is hydrogen atom or a hydroxy group.

5. The acrylonitrile polymer composition of claims 1, 2 or 3, wherein the acrylonitrile polymer (I) is a copolymer obtained by copolymerizing more than 60% by weight of acrylonitrile, 3 to 20% by weight of vinyl bromide and up to 20% by weight of another comonomer copolymerizable with acrylonitrile and vinyl bromide.

6. The acrylonitrile polymer composition of claim 1, wherein said composition contains 0.1 to 3% by weight of antimony oxide as a flame retardant filler.

* * * * *

UNITED STATES PATENT AND TRADEMARK OFFICE
CERTIFICATE OF CORRECTION

PATENT NO. : 4,181,581
DATED : JAN. 1, 1980
INVENTOR(S) : HIROSHI IWATA ET AL

It is certified that error appears in the above-identified patent and that said Letters Patent are hereby corrected as shown below:

On The Title Page:

---[75] Hiroshi Iwata; Takeji Ohtani; Seiichi Arakawa; Seiji Deguchi, all of Otake, Japan---

Signed and Sealed this

Twenty-fourth Day of June 1980

[SEAL]

*Attest:*

SIDNEY A. DIAMOND

*Attesting Officer*    *Commissioner of Patents and Trademarks*